Figure 1:
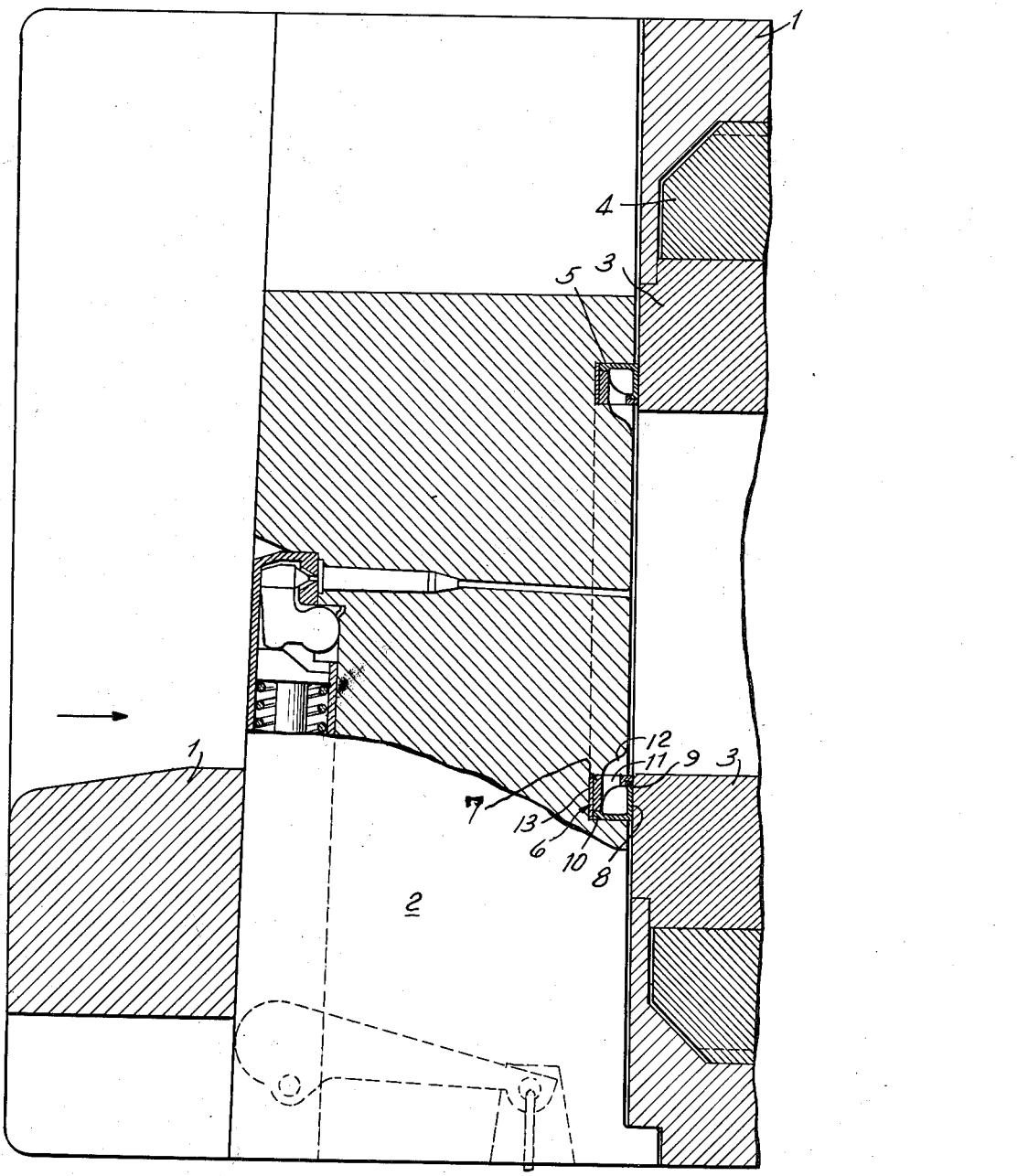

March 24, 1964 E. BARTELS 3,125,928
PACKING RING FOR FIREARMS
Original Filed Sept. 26, 1960 3 Sheets-Sheet 1

INVENTOR
ERICH BARTELS
BY
Watson, Cole, Grindle & Watson
ATTORNEYS

March 24, 1964 E. BARTELS 3,125,928
PACKING RING FOR FIREARMS
Original Filed Sept. 26, 1960 3 Sheets-Sheet 2

INVENTOR
ERICH BARTELS
BY Watson, Cole, Grindle & Watson
ATTORNEYS

March 24, 1964  E. BARTELS  3,125,928
PACKING RING FOR FIREARMS
Original Filed Sept. 26, 1960  3 Sheets-Sheet 3
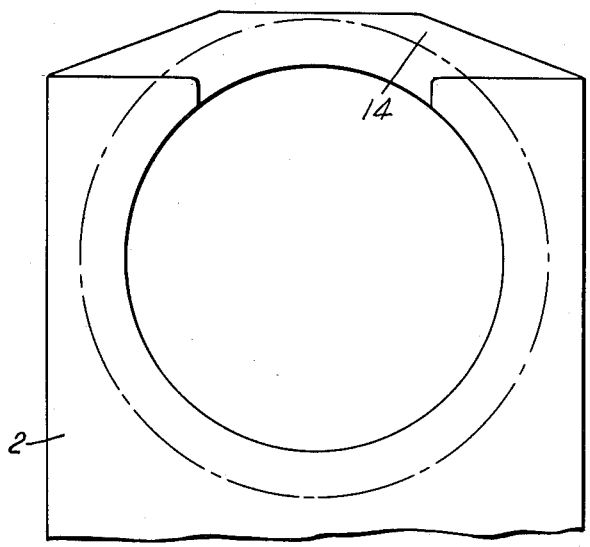
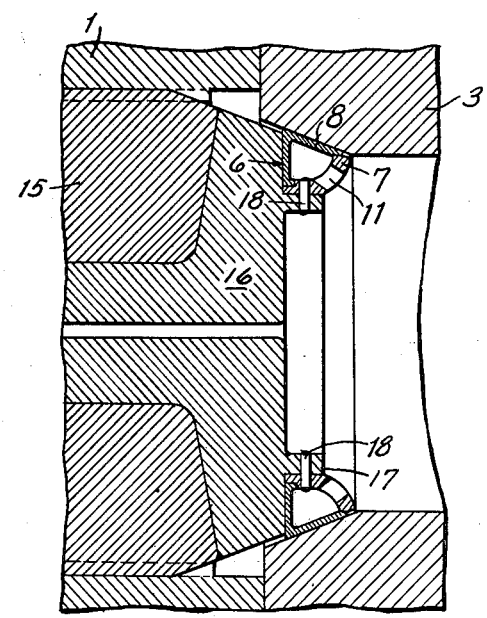
INVENTOR
ERICH BARTELS

United States Patent Office 3,125,928
Patented Mar. 24, 1964

3,125,928
PACKING RING FOR FIREARMS
Erich Bartels, Ratingen, near Dusseldorf, Germany, assignor to Firma Rheinmetall G.m.b.H., a firm of Germany
Original application Sept. 26, 1960, Ser. No. 58,439, now Patent No. 3,099,937, dated Aug. 6, 1963. Divided and this application June 15, 1962, Ser. No. 202,806
Claims priority, application Germany Sept. 26, 1959
2 Claims. (Cl. 89—26)

This application is a division of co-pending application Serial No. 58,439 filed September 26, 1960, now Patent No. 3,099,937.

The invention relates also to a packing ring for firearms, more particularly for gun breeches, which differ from known designs mainly in that the packing ring consists of a hollow ring comprising two individual rings with their longitudinal edges in contact with one another and located in the breech block or in the end block of the gun barrel or in the head of the closing bolt of the end block of the gun, and that at its periphery the said packing ring is provided with apertures for the propellant gases which provide the sealing force.

In a preferred embodiment constructed in accordance with the invention the cross section of both the individual rings is of angular or nearly angular shape; one of these rings supports the other one—the sealing ring, so-called, which provides the seal—and secures it in position. The supporting ring is provided with apertures giving access to the propellant gases.

Since the life of a packing ring depends on the most highly stressed ring of angular section, the two longitudinal edges of the sealing ring which are in contact with the supporting ring are, in further development of the invention, increased in thickness so as to form a bead next to the supporting ring, particularly where the packing ring is used as a packing ring for breech blocks. This prevents the formation of small cracks in and of distortion of the said edges after high loads are imposed on them due to the firing of the gun.

If in accordance with the invention, the hollow packing ring is located in the end of the gun barrel, the breech block is with advantage provided with a projetcion at the loading cavity which, when the breech is open, protects the hollow packing ring. This prevents damage to the packing ring during the loading operation.

If the packing ring is provided in the closing bolt of the end block, it is with advantage located in a depression at the end face of the head of the closing bolt. In a preferred embodiment the end face of the head of the closing bolt is provided with a projecting annular collar to which the supporting ring of the hollow packing ring is attached in such a manner as to be capable of removal.

Further, in accordance with the invention, an adjusting disc can always be provided between the rear face of the supporting ring and the depression or recess accommodating the hollow packing ring, for the purpose of taking up any play between the packing surface of the sealing ring and the end face of the gun barrel.

Figure 2:
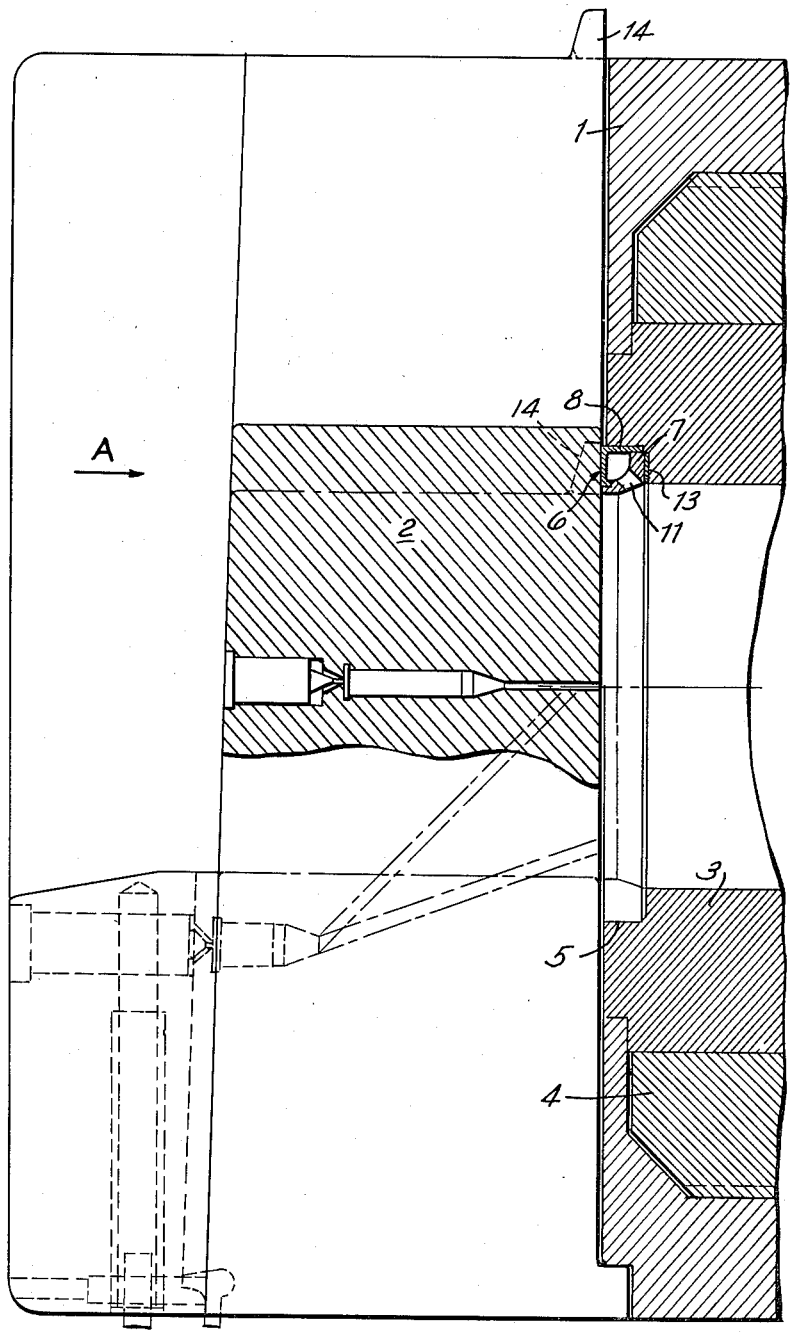

Further details of the invention will now be explained by reference to the embodiments illustrated on the drawings in which;

FIG. 1 is a section through a gun breech with a packing ring fitted to the gun barrel, FIG. 2 is a section through a gun breech with a packing ring fitted to the gun barrel, FIG. 2a is an end view of the breech block, and FIG. 3 is a section through a gun breech incorporating a packing ring fitted to the head of the closing bolt of the end block.

On the drawing, the same components are labelled by the same reference symbols.

In the embodiment represented by FIG. 1, which relates to a packing ring for a breech block, the front face of the breech block 2, which faces the gun barrel 3 and the outer barrel 4, accommodates a seating 5 for the packing ring 6 which is made in the form of a hollow ring consisting of two rings 7 and 8 having an angular cross section which touch one another at their longitudinal edges which face one another. In this arrangement the ring 7 of angular section provides a support for the ring 8 of angular section, the latter being a sealing ring. It will be seen from the drawing that at the edges which face the supporting ring 7, the thickness of the sealing ring 8 is increased so as to form a bead 9, 10 at either edge which extends over the whole periphery. In addition, the periphery of the supporting ring 7 is provided with apertures 11 admitting the propellant gases which can enter through the recess 12, which is in communication with the ring. Finally, an adjusting disc 13 is provided in order to take up any play which may exist between the front face of the seating ring 8 and the end face of the gun barrel.

The propellant gases developed when a shot is fired pass through the recess 12 and the apertures 11 into the hollow ring 6 and cause the sealing ring 8, to be forced against the end face of the gun barrel 3 and the periphery of the seating 5 which is located in the breech block 2.

In the embodiment according to FIG. 2, the seating 5 is located—in contrast to the arrangement shown in FIG. 1—in the gun barrel 3. The construction of the hollow ring 6, which constitutes a packing ring, is the same as that shown in FIG. 1.

In order to protect the packing ring during the operation of loading the gun against damage, a projection 14 is provided at that face of the breech block 2 which faces the loading cavity; this projection provides protection for the packing ring when the breech is open. This position of the projection is indicated in FIG. 2 by chain-dotted lines.

The advantage of the arrangement shown in FIG. 2, in which the packing ring is located in the gun barrel 3, is that the height of the breech block 2, measured normal to the centre line of the barrel, is considerably less than in the arrangement according to FIG. 1, i.e. in the case of the arrangement of the packing ring in the breech block. The breech block may have the usual normal dimensions except for the protective projection 14. Also, the end block 1 may have the normal dimensions.

In the embodiment according to FIG. 3 the packing ring 6 is located in the head 16 of the closing bolt 15. It will be seen from the drawing that the head is provided with an annular collar 17 projecting in the direction of the gun barrel 3, and carrying the ring 7 supporting the packing ring 6 by means of cylindrical pins 18. The comparatively large space available for the packing ring is of a particularly favourable effect for the design of the sealing ring 8.

It is an advantage of this embodiment that the head 16 of the closing bolt is low, so that the loading chamber is correspondingly short. The plane of separation between the closing bolt and the rotating head 16 is no longer located in the neighborhood of the packing, as happens in the case of the known plastic packing in which the closing bolt rotates with respect to the stationary packing surface. In addition, it is not necessary that the head is supported by a flexible base for it rests firmly upon the rotating surface of the closing bolt 15. The arrangement is simpler to manufacture and the spring required for other designs in this arrangement is no longer required.

The invention is not restricted to the embodiments herein illustrated and described by way of example. Thus, the packing ring consisting of the parts 7, 8 may have cross sections of a shape different from that shown on the drawings. Also, further modifications of the positioning of the packing ring 6 are possible.

What I claim is:

1. A firearm comprising a barrel, a closing bolt having a head, a hollow ring composed of two individual rings, each having peripheral edges with the edges of one individual ring contacting the edges of the other ring to form a hollow ring space, one ring being a sealing ring and having a two-sided angular configuration in cross section and the other ring being a supporting ring and having a plurality of bores therein to admit into the hollow ring the propellant gases upon firing the firearm, one side of the two-sided angular configuration of the sealing ring abutting against the head of the closing bolt, and a plurality of pins projecting into the head and the hollow ring in one of the two individual rings thereof in order to support the packing ring.

2. A firearm according to claim 1, in which an annular collar is provided on the head through which the pins project.

References Cited in the file of this patent

UNITED STATES PATENTS

| | | |
|---|---|---|
| 1,974,986 | Ferlin | Sept. 25, 1934 |
| 2,016,227 | Clausen | Oct. 1, 1935 |
| 2,559,564 | Sperling | July 3, 1951 |
| 3,042,246 | Welty et al. | July 3, 1962 |

FOREIGN PATENTS

| | | |
|---|---|---|
| 6,873 | Great Britain | of 1892 |
| 920,296 | France | Jan. 2, 1947 |